(12) United States Patent
Hwang et al.

(10) Patent No.: US 10,319,253 B2
(45) Date of Patent: Jun. 11, 2019

(54) COGNITIVE WORKLOAD AWARENESS (71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/400,644

(22) Filed: Jan. 6, 2017

(65) Prior Publication Data
US 2018/0197429 A1 Jul. 12, 2018

(51) Int. Cl.
*G06N 5/04* (2006.01)
*G09B 7/02* (2006.01)
*G09B 19/16* (2006.01)

(52) U.S. Cl.
CPC .................. *G09B 7/02* (2013.01); *G06N 5/04* (2013.01); *G09B 19/162* (2013.01); *G09B 19/165* (2013.01); *G09B 19/167* (2013.01)

(58) Field of Classification Search
CPC ...... G09B 7/02; G09B 19/162; G09B 19/165; G09B 19/167; G06N 3/006
See application file for complete search history.

(56) References Cited

U.S. PATENT DOCUMENTS

| | | | |
|---|---|---|---|
| 9,055,905 B2 | 6/2015 | Watkins et al. | |
| 9,135,849 B2 | 9/2015 | Herger et al. | |
| 2004/0252027 A1* | 12/2004 | Torkkola | G08B 21/06 340/576 |
| 2010/0245064 A1 | 9/2010 | Fleishman et al. | |
| 2011/0295086 A1* | 12/2011 | Nakada | A61B 5/0476 600/301 |
| 2012/0004802 A1* | 1/2012 | Horvitz | G06N 99/005 701/29.1 |

(Continued)

FOREIGN PATENT DOCUMENTS

| | | |
|---|---|---|
| KR | 101324082 B1 | 5/2013 |
| KR | 20130130538 A | 12/2013 |

OTHER PUBLICATIONS

Patten, C. J., et al. "Driver experience and cognitive workload in different traffic environments", Accident Analysis and Prevention 38, Feb. 28, 2006, pp. 887-894.

(Continued)

*Primary Examiner* — Corbett B Coburn
(74) *Attorney, Agent, or Firm* — Kunzler, PC (57) ABSTRACT

For determining cognitive workload awareness in driving context, an apparatus is disclosed. In some embodiments, the apparatus includes an activity monitor module that monitors driving activities of a driver. The apparatus includes a workload analysis module that determines a cognitive workload of the driver associated with the driving activities of the driver. Further, the apparatus includes a question-and-answer (QnA) dispatch module that determines an available QnA cognitive workload of the driver for performing QnA tasks based on the cognitive workload while ensuring a safe cognitive workload boundary associated with the driving activities of the driver.

20 Claims, 9 Drawing Sheets

(56) References Cited

U.S. PATENT DOCUMENTS

| | | | |
|---|---|---|---|
| 2012/0174111 A1* | 7/2012 | Pala | G06F 3/011 |
| | | | 718/102 |
| 2012/0235819 A1* | 9/2012 | Watkins | A61B 5/18 |
| | | | 340/573.1 |
| 2014/0257989 A1 | 9/2014 | Prakah-Asante et al. | |
| 2014/0278781 A1 | 9/2014 | Liu et al. | |
| 2015/0025917 A1* | 1/2015 | Stempora | G06Q 40/08 |
| | | | 705/4 |
| 2015/0160020 A1* | 6/2015 | van Hemert | A61B 5/18 |
| | | | 701/532 |
| 2015/0321604 A1* | 11/2015 | MacNeille | B60R 16/02 |
| | | | 706/11 |
| 2016/0189444 A1 | 6/2016 | Madhok et al. | |
| 2017/0208027 A1* | 7/2017 | Goldstein | H04L 51/26 |

OTHER PUBLICATIONS

Medenica, Z., & Kun, A. L. "Data synchronization for cognitive load estimation in driving simulator-based experiments", AutomotiveUI'12, Adjunct Proceedings, Oct. 17-19, 2012, 3 pages.

* cited by examiner

COGNITIVE WORKLOAD AWARENESS

FIELD

The subject matter disclosed herein relates to a system, an apparatus, and a method for implementing cognitive workload awareness in driving context.

BACKGROUND

Typically, drivers participate in daily driving activities with non-trivial time spent focused on their driving. In some cases, average drivers may devote about 58 minutes to driving per day, which may consume a non-trivial portion of a driver's active daily time, such as, e.g., 1 out of 16 hours in a 24 hour period of a day. Generally, driving hours are non-productive, and even though drivers should not be distracted while driving, it does not mean that drivers cannot do anything while driving. For instance, a driver can chat with a passenger, a driver can listen to music and control car audio, and a driver can make hands-free phone calls. Recently, in some cases, a driver can make voice commands to a built-in car voice recognition system or voice-activated mobile services.

BRIEF SUMMARY

An apparatus for implementing cognitive workload awareness in driving context is disclosed herein. In one embodiment, the apparatus includes an activity monitor module that monitors driving activities of a driver. The apparatus includes a workload analysis module that determines a cognitive workload of the driver associated with the driving activities of the driver. The apparatus includes a question-and-answer (QnA) dispatch module that determines an available QnA cognitive workload of the driver for performing QnA tasks based on the cognitive workload while ensuring a safe cognitive workload boundary associated with the driving activities of the driver.

A method for implementing cognitive workload awareness is disclosed. In one embodiment, the method includes monitoring driving activities of a driver while the driver is operating a vehicle. The method includes determining a current cognitive workload and a safe cognitive workload of the driver associated with the driving activities of the driver. The method includes determining an available QnA cognitive workload of the driver for performing QnA tasks based on the current cognitive workload while ensuring a safe cognitive workload boundary associated with the safe cognitive workload of the driver. The method includes selecting a QnA task out of a pool of QnA tasks so that an additional cognitive workload that the selected QnA task will add to the current cognitive workload does not exceed the available QnA cognitive workload. The method includes fetching the QnA task for driver response if a summation of the current cognitive workload and the additional cognitive workload that the fetched QnA task will add to the current cognitive workload is less than the safe cognitive workload so as to ensure the safe cognitive workload boundary. In some cases, the fetched QnA task for driver response may have a corresponding cognitive workload of less than a difference between the safe cognitive workload and the cognitive workload.

A computer program product that performs the functions of the method is disclosed. In one embodiment, the computer program product includes computer readable storage media having program instructions embodied therewith, the program instructions are readable/executable by a computer to cause the computer to monitor driving activities of a driver while the driver is operating a vehicle. The program instructions cause the computer to determine a cognitive workload and a safe cognitive workload of the driver associated with the driving activities of the driver. The program instructions cause the computer to determine an available QnA cognitive workload of the driver for performing QnA tasks based on the cognitive workload while ensuring a safe cognitive workload boundary associated with the safe cognitive workload of the driver. Further, the program instructions cause the computer to fetch a QnA task for driver response if a summation of the cognitive workload and an additional cognitive workload that the fetched QnA task will add to the cognitive workload is less than the safe cognitive workload so as to ensure the safe cognitive workload boundary. In some cases, the fetched QnA task for driver response may have a corresponding cognitive workload of less than a difference between the safe cognitive workload and the cognitive workload.

A device for implementing cognitive workload awareness is disclosed. In one embodiment, the device includes a processor and memory having stored thereon instructions that, when executed by the processor, cause the processor to monitor driving activities of a driver while the driver is operating a vehicle. The instructions cause the processor to determine a cognitive workload and a safe cognitive workload of the driver associated with the driving activities of the driver. The instructions cause the processor to determine an available QnA cognitive workload of the driver for performing QnA tasks based on the cognitive workload while ensuring a safe cognitive workload boundary associated with the safe cognitive workload of the driver. The instructions cause the processor to fetch a QnA task for driver response if a summation of the cognitive workload and an additional cognitive workload that the fetched QnA task will add to the cognitive workload is less than the safe cognitive workload so as to ensure the safe cognitive workload boundary. In some cases, the fetched QnA task for driver response may have a corresponding cognitive workload of less than a difference between the safe cognitive workload and the cognitive workload.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to thereby provide a thorough understanding of embodiments. One skilled in the relevant art will recognize, however, that embodiments may be practiced without one or more of the specific details, or with other methods, components, materials, and so forth. In some other instances, well-known structures, materials, or operations are not shown or described in detail to avoid obscuring aspects of an embodiment.

Figure 1:
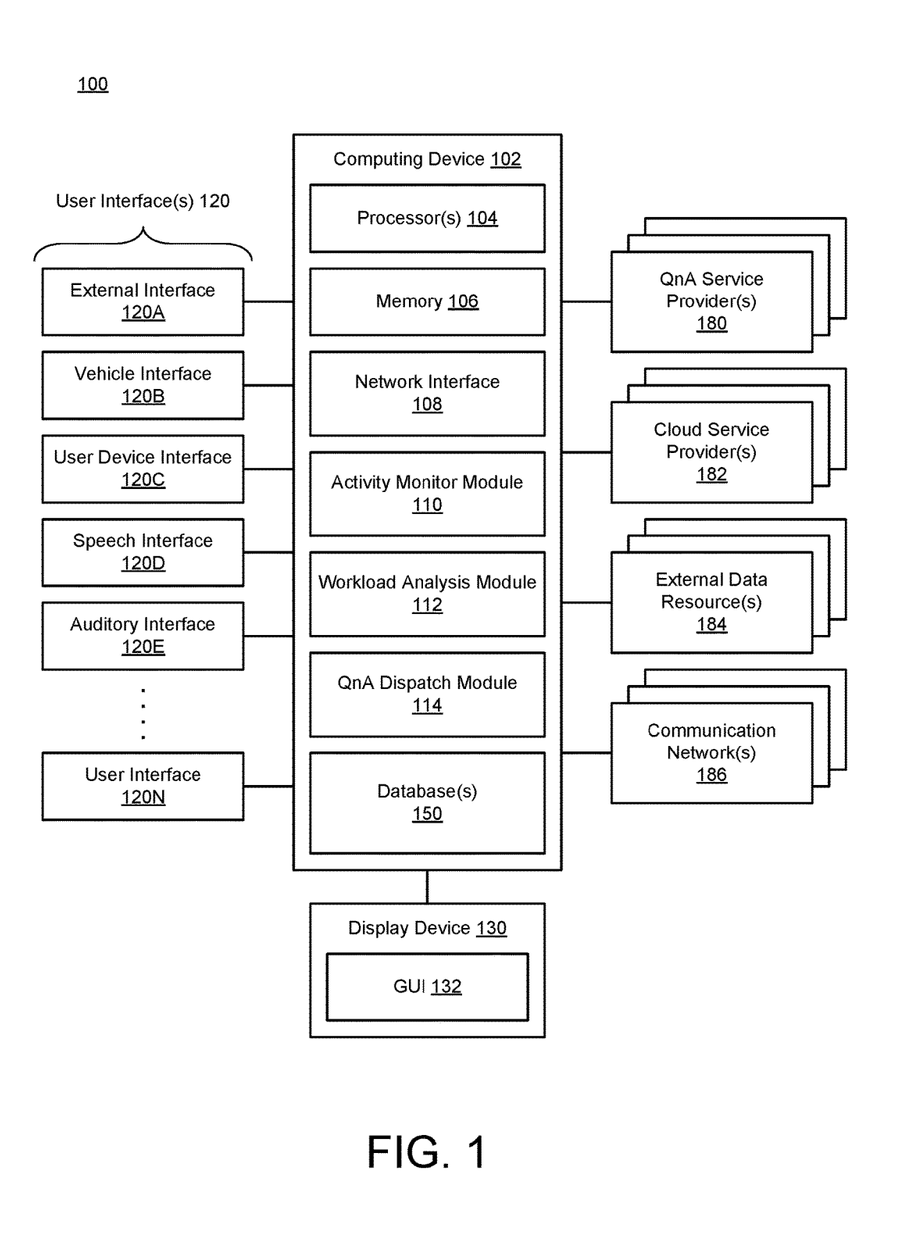
FIG. 1 is a block diagram illustrating one embodiment of an apparatus for implementing cognitive workload awareness in driving context.

FIG. 1 is a block diagram illustrating one embodiment of an apparatus 100 that utilizes a computing device 102 for implementing cognitive workload awareness in driving context with various methods and techniques associated therewith. In some cases, the apparatus 100 may be used for question-and-answer (QnA) style micro-task scheduling for drivers with cognitive workload awareness in driving context. Further, various schemes and/or techniques described herein may refer to service architecture that is configured for cognitive workload-aware QnA dispatch in driving context.

In reference to FIG. 1, the apparatus 100 may be implemented as a system having the computing device 102 purposed for cognitive workload awareness, to thereby transform the computing device 102 into a special purpose machine dedicated to cognitive workload awareness in driving context, as described herein. Therefore, the computing device 102 may include standard element(s) and/or component(s), including at least one processor(s) 104, memory 106 (e.g., non-transitory computer-readable storage medium), peripherals, power, and various other computing elements and/or components that are not specifically shown in FIG. 1. Further, as shown in FIG. 1, the apparatus 100 may be associated with a display device 130 (e.g., a monitor or other display) that may be used to provide a graphical user interface (GUI) 132. In some implementations, the GUI 132 may be used to receive input from a user (e.g., user input) associated with cognitive workload awareness in driving context. In other implementations, one or more other user interfaces (UI) 120 (e.g., one or more other user input devices or similar) may be used to receive input from one or more other users (e.g., other user input) associated with cognitive workload awareness in driving context. The apparatus 100 may also be associated with one or more databases 150 that may be configured to store data and information associated with users including messages and various communication data associated with the users.

Accordingly, the apparatus 100 may thus include the computing device 102 and instructions recorded on the computer-readable medium 106 (or one or more databases 150) and executable by the at least one processor 104. The apparatus 100 may be utilized to monitor various activities of users. Further, the apparatus 100 may include the display device 130 for providing output to a user, and the display device 130 may include the GUI 132 for receiving input from the user. Still further, the one or more other UIs 120 may be used for providing output to other users and receiving input from the other users.

The computing device 102 may include a network interface 108 adapted for communication with various external resources and/or external networks. For instance, the external resources may include one or more QnA service providers 180, one or more cloud service providers 182, and various other external data resources 184. In another instance, the external networks may include various types of communication networks 186. The network interface 108 may be embodied as a wireless communication module, such as a mobile cellular module, a wireless broadband module, a wireless satellite module, and/or various other types of wireless communication module including radio frequency (RF), microwave frequency (MWF), and/or infrared frequency (IRF) components adapted for communication with the various types of communication networks 186. The network interface 108 may be further adapted to interface with a DSL (e.g., Digital Subscriber Line) modem, a PSTN (Public Switched Telephone Network) modem, an Ethernet device, and/or various other types of wired and/or wireless network communication devices adapted for communication with the various types of communication networks 186.

The computing device 102 may include one or more modules, such as, e.g., an activity monitor module 110. In some scenarios, the activity monitor module 110 may be used to monitor driving activities of a driver. Further, the activity monitor module 110 may monitor the driving activities of the driver while the driver is operating a vehicle, such as, e.g., any type of motor vehicle including various land-based automobiles, cars, trucks, etc., various marine-based vehicles, ships, boats, etc., and/or various air-based vehicles, aircraft, airplanes, helicopters, etc.

The driving activities of the driver may include various routine mental, physical, and/or temporal tasks associated with driving and operating a vehicle in various environments, such as, e.g., mental focus on driving conditions, physical movements of operating components, trip scheduling, etc. In some instances, the driving activities of the driver may include talking with one or more passengers while the driver is operating a vehicle. In other instances, the driving activities of the driver may include talking with one or more persons on a communication device, such as, e.g., a mobile phone. In some other instances, the driving activities of the driver may include one or more of listening to music, controlling car audio, conducting hands-free communication via a wireless network, and/or various other types of driving activities and/or driving tasks that may be associated with a driver driving and/or operating a vehicle.

The computing device 102 may include a workload analysis module 112. In some scenarios, the workload analysis module 112 may be used to determine a cognitive workload of the driver associated with the driving activities of the driver. The cognitive workload of the driver may also be referred to as a current cognitive workload of the driver. The workload analysis module 112 may determine a safe cognitive workload of the driver associated with the driving activities of the driver. The cognitive workload of the driver may include a baseline cognitive workload of the driver and one or more variable cognitive workloads of the driver associated with the driving activities of the driver. The baseline cognitive workload may be associated with default driving activities of the driver including driving a vehicle under routine mental, physical, and temporal operating conditions. The one or more variable cognitive workloads may include one or more intensive task workloads associated with metropolitan driving activities, congested driving activities, extreme weather driving activities, and/or night driving activities. Further, in various implementations, the one or more variable cognitive workloads may also include one or more of listening to music, controlling car audio, talking with one or more passengers onboard, and/or conducting hands-free communication via a wireless network.

In some implementations, the workload analysis module 112 may determine an interface modality of the driver including, e.g., hands-free communication between the apparatus and the driver. The hands-free communication between the apparatus and driver may include audible speech from the driver and/or voice recognition by the apparatus via one or more user interface components and a microphone. The hands-free communication between the apparatus and driver may further include audible listening by the driver and computerized speech from the apparatus via one or more user interface components and a speaker. The apparatus may include the computing device 102.

Generally, whether a driver participates in certain tasks or not while driving may depend on the driver's cognitive workload and interface modality. In some cases, cognitive workload constraints may refer as to whether a certain task adds extra cognitive workloads to result in a total workload high enough to affect a driver's driving activity, in which cases, the driver may not be able to participate in the task. In other cases, interface modality constraints may refer to various tasks that may not use modalities continuously necessary to driving, such as, e.g., visual attention, hands, feet, etc. Acceptable modalities may be analogous to those of a hands-free phone call or similar, which may involve, e.g., speaking and/or hearing. Therefore, in some driving context scenarios, the schemes and/or techniques described herein in reference to cognitive workload-aware QnA dispatching in driving context may be achieved. Some QnA tasks may include paid QnA tasks, and other similar or related QnA tasks are described in greater detail herein.

The computing device 102 may include a question-and-answer (QnA) dispatch module 114. In some scenarios, the QnA Dispatch module 114 may be used to determine an available QnA cognitive workload of the driver for performing various QnA tasks based on the cognitive workload while ensuring a safe cognitive workload boundary associated with the driving activities of the driver. In some other scenarios, the QnA dispatch module 114 may be used to select a QnA task from (or out of) a pool of QnA tasks so that an additional cognitive workload that the selected QnA task will add to the cognitive workload does not exceed the available QnA cognitive workload. If a summation of the cognitive workload and the additional cognitive workload that the fetched QnA task will add to the cognitive workload is less than the safe cognitive workload, then the QnA dispatch module 114 may fetch the QnA task for driver response so as to ensure the safe cognitive workload boundary. Otherwise, if the summation of the cognitive workload and the additional cognitive workload that the fetched QnA task will add to the cognitive workload is equal to or greater than the safe cognitive workload, then the QnA dispatch module 114 may not fetch a QnA task for driver response so as to ensure the safe cognitive workload boundary. The fetched QnA task for driver response may include a corresponding cognitive workload of less than a difference between the safe cognitive workload and the cognitive workload.

In reference to cognitive activity, cognitive workload generally refers total mental effort utilized for working memory. Cognitive workload involves problem solving that may be differentiated into intrinsic, extraneous, and germane. For instance, intrinsic cognitive workload may refer to mental effort associated with specific topics. Extraneous cognitive workload may refer to a mental process by which information and/or tasks are presented. Germane cognitive workload may refer to mental attributed toward generating permanent stores of knowledge or schemas. The means by which to measure perceived mental effort may be referred to as cognitive workload. Various task-invoked responses provide reliable measurement of cognitive workload that may be associated with working memory. Cognitive workload has various effects on task related activities, and experiences of cognitive workload may be similar or somewhat different for everyone.

The QnA tasks may include targeted questions while the driver is operating a vehicle. The QnA tasks may include dynamically fetched QnA tasks associated with one or more of surveys, polls, and/or context aware questions. The QnA tasks may include customer satisfaction surveys. The QnA tasks may include public polling interviews. The QnA tasks may include crowd-source questions including one or more of single-sentence interpretation, ground-truth tagging to auditory data, and/or unknown music classification associated with genre and/or mood. The QnA tasks may include context aware questions including one or more of traffic status questions, accident report questions, and/or point-of-view (PoV) questions associated with location and/or time. Further, in some cases, one or more different languages (e.g., English, Spanish, French, German, Russian, etc.) may be used for and/or applied to the QnA tasks and/or questions.

Thus, in some cases, the QnA task and/or questions may be language oriented questions, and as such, the questions may be asked in one language and then answered in a different language.

The user interfaces (UIs) 120 may include various types of user interfaces 120A, 120B, . . . , 120N that provide diagnostic data and information for implementing various features of cognitive workload awareness in driving context. For instance, the user interfaces (UIs) 120 may include an external interface 120A that is configured to receive external data and information from external environmental sensors, cloud service providers 182, and/or external data resources 184 including environmental data and information (e.g., data and information related to traffic, weather, global positioning system (GPS) data and information, etc.). The user interfaces (UIs) 120 may include a vehicle interface 120B that is configured to receive vehicle related data and information from the wired and/or wireless communication networks 186 including diagnostic data and information from onboard systems and diagnostic sensors for the vehicle (e.g., data and information relate to engine, brakes, cooling system, speed, driving styles, etc.).

Further, the user interfaces (UIs) 120 may include a user device interface 120C that is configured to receive user input data and information (e.g., user input data and information related to user preferences, user control settings, etc.) from one or more user devices (e.g., mobile phone, personal computer, notebook, laptop, etc.). The user interfaces (UIs) 120 may include a speech interface 120D that is configured to receive audible speech, vocal, and/or voice input data and information from one or more users via one or more user devices (e.g., one or more microphones, or similar). The user interfaces (UIs) 120 may include an auditory interface 120E that is configured to provide audible output data and information to one or more auditory devices (e.g., one or more speakers, or similar). The user interfaces (UIs) 120 may include any type of user interface 120N that is configured to receive (as input) or provide (as output) various data and information for implementing cognitive workload awareness in driving context.

In reference to FIG. 1, the apparatus 100 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the apparatus 100 of FIG. 1 may be included as well even though such standard and/or conventional elements are not illustrated explicitly, for the sake of clarity and convenience.

Figure 2A:
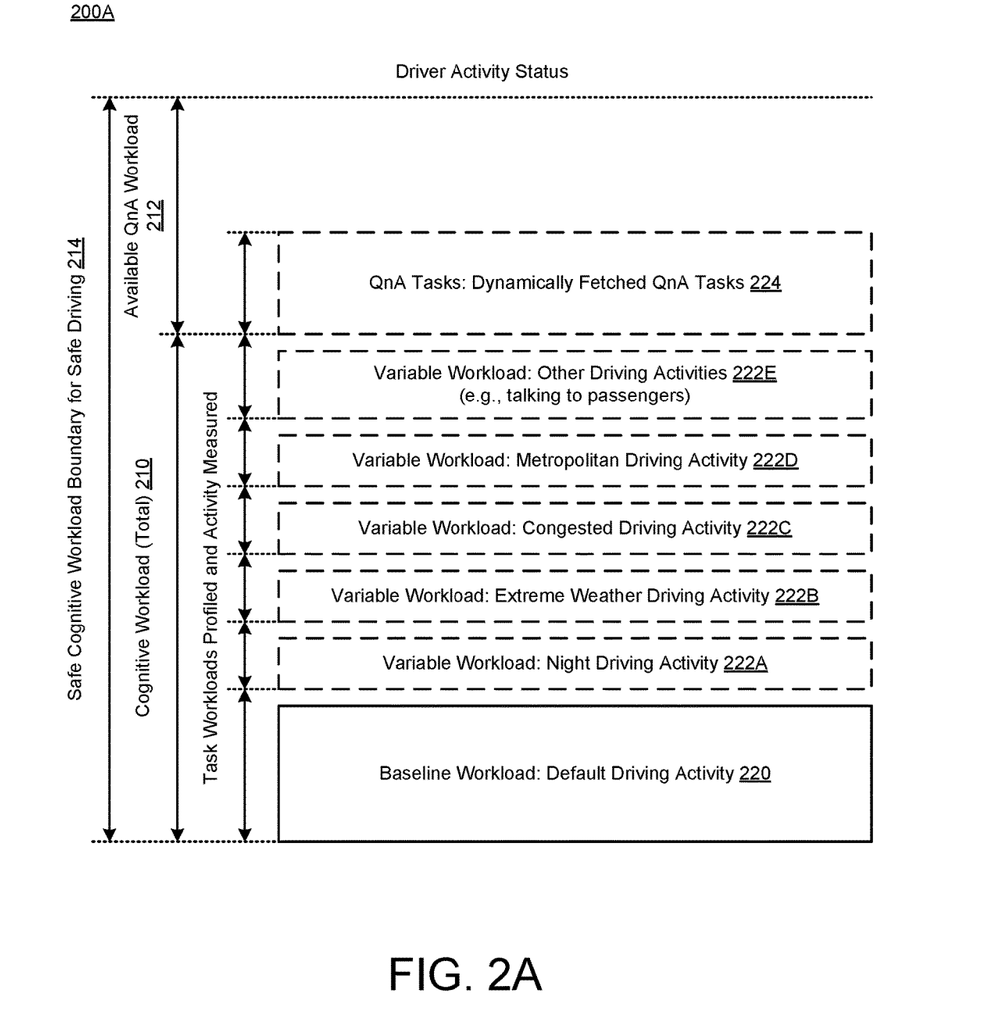
FIGS. 2A-2B are various diagrams illustrating one embodiment of driver activity status and various components related thereto.
Figure 2B:
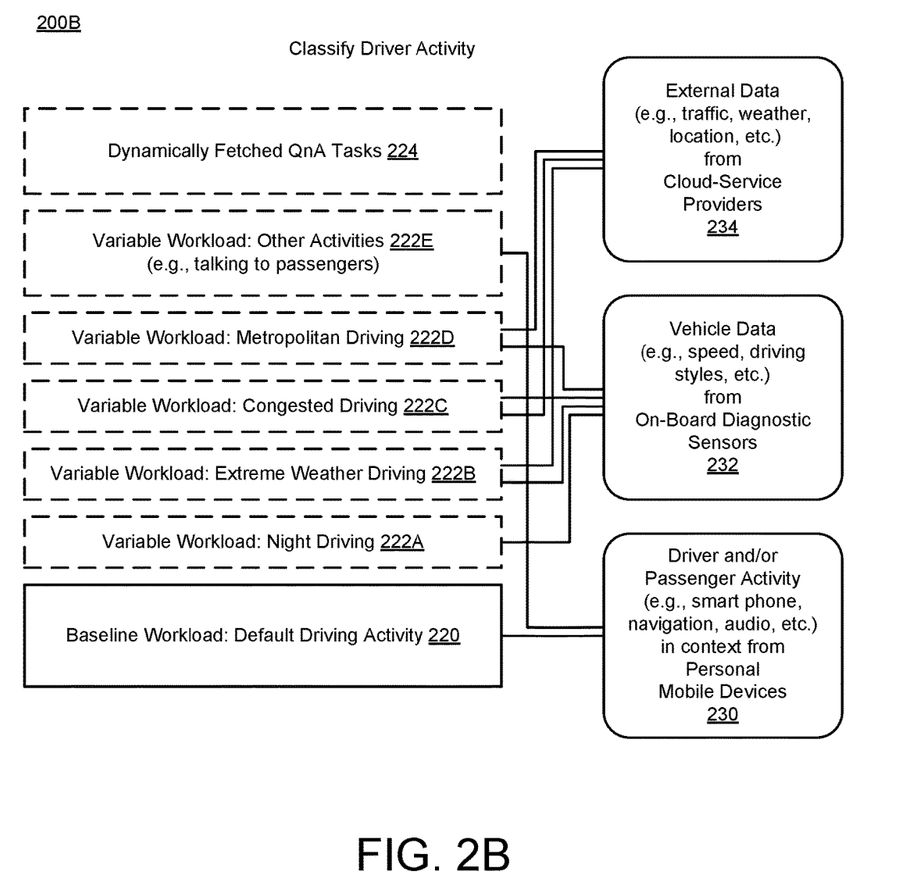

FIGS. 2A-2B are various diagrams illustrating one embodiment of driver activity status and various components related to collecting and classifying driving context data and information. In particular, FIG. 2A illustrates a diagram of driver activity status 200A, and FIG. 2B illustrates various components related to collecting and/or classifying driving context data and information. Some considerations may include how to dispatch QnA tasks while ensuring a safe cognitive workload boundary. Other considerations may include how to collect and/or classify driving context data and information.

In reference to FIG. 2A, various driving activities of a driver are tracked, monitored, and identified, and a (total) cognitive workload 210 of the driver is determined based on the driving activities of the driver. Further, an available QnA cognitive workload 212 of the driver is determined for performing QnA tasks 224 based on the (total) cognitive workload 210 while ensuring a safe cognitive workload boundary for safe driving 214 associated with the driving activities of the driver. In some cases, cognitive workload of the driver may shift toward micro-tasking while driving, which may thus refer to cognitive workload-aware task distribution to drivers.

The (total) cognitive workload 210 of the driver may include a baseline cognitive workload 220 of the driver and one or more variable cognitive workloads 222A, 222B, . . . , 222E of the driver associated with the driving activities of the driver. In some scenarios, the baseline cognitive workload 220 are associated with various default driving activities of the driver including driving a vehicle under routine mental, physical, and/or temporal operating conditions. The one or more variable cognitive workloads 222A, 222B, . . . , 222E may include one or more intensive task workloads associated with night driving activity 222A, extreme weather driving activity 222B, congested driving activity 222C, and/or metropolitan driving activity 222D. Further, the variable cognitive workloads may include various other types of driving activities 222E including, e.g., talking with other passengers in the vehicle while the driver is operating the vehicle. Various other types of variable cognitive workloads may include one or more of listening to music, controlling car audio, and conducting hands-free communication via a wireless network. In some implementations, the baseline cognitive workload 220 and each of the variable cognitive workloads 222A, 222B, . . . , 222E may be referred to as task workloads that are profiled and any related activity is measured. Generally, as driving conditions become more and more difficult, the driver's attention should focus on driving, and the driver's cognitive workload should shift toward driving activities. Otherwise, if driving conditions become less difficult, the driver's attention could possibly focus less on driving, and the driver's cognitive workload could shift toward answering QnA tasks and/or questions.

In reference to the available QnA cognitive workload 212 of the driver, the QnA tasks 224 may include dynamically fetched QnA tasks associated with one or more of surveys, polls, and/or context aware questions. In some cases, the QnA tasks 224 may include customer satisfaction surveys and/or public polling interviews. In some cases, the QnA tasks 224 may include crowd-source questions related to, e.g., one or more of single-sentence interpretation, various ground-truth tagging to auditory data, and unknown music classification associated with genre and/or mood. Further, in some cases, the QnA tasks 224 may include context aware questions including one or more of traffic status questions, accident report questions, and/or point-of-view (PoV) questions associated with location, time, and/or some combination thereof, such as, e.g., location in context of time.

In reference to FIG. 2B, the various driving activities of a driver and the various components related thereto may be collected and/or classified based on the driving context data and information. For instance, the baseline cognitive workload 220 may be associated with driver and/or passenger activity in driving context from personal mobile devices 230, such as, e.g., smart phones, various wearable communication devices, audio devices, navigation devices, etc. In some instances, the variable workload for night driving activity 222A may be associated with vehicle data from various onboard diagnostic sensors 232, such as, e.g., speed, driving styles, etc. In some instances, the variable workload for one or more of extreme weather driving activity 222B, congested driving activity 222C, and/or metropolitan driving activity 222D may be associated with vehicle data from the various onboard diagnostic sensors 232 and external data from cloud service providers 234, such as, e.g., traffic data providers, weather data providers, location data providers, temporal data providers, etc. In other instances, the variable workload for other activities 222E (e.g., talking or speaking to passengers, or similar) may be associated with driver and/or passenger activity in driving context from personal mobile devices 230.

Figure 3A:
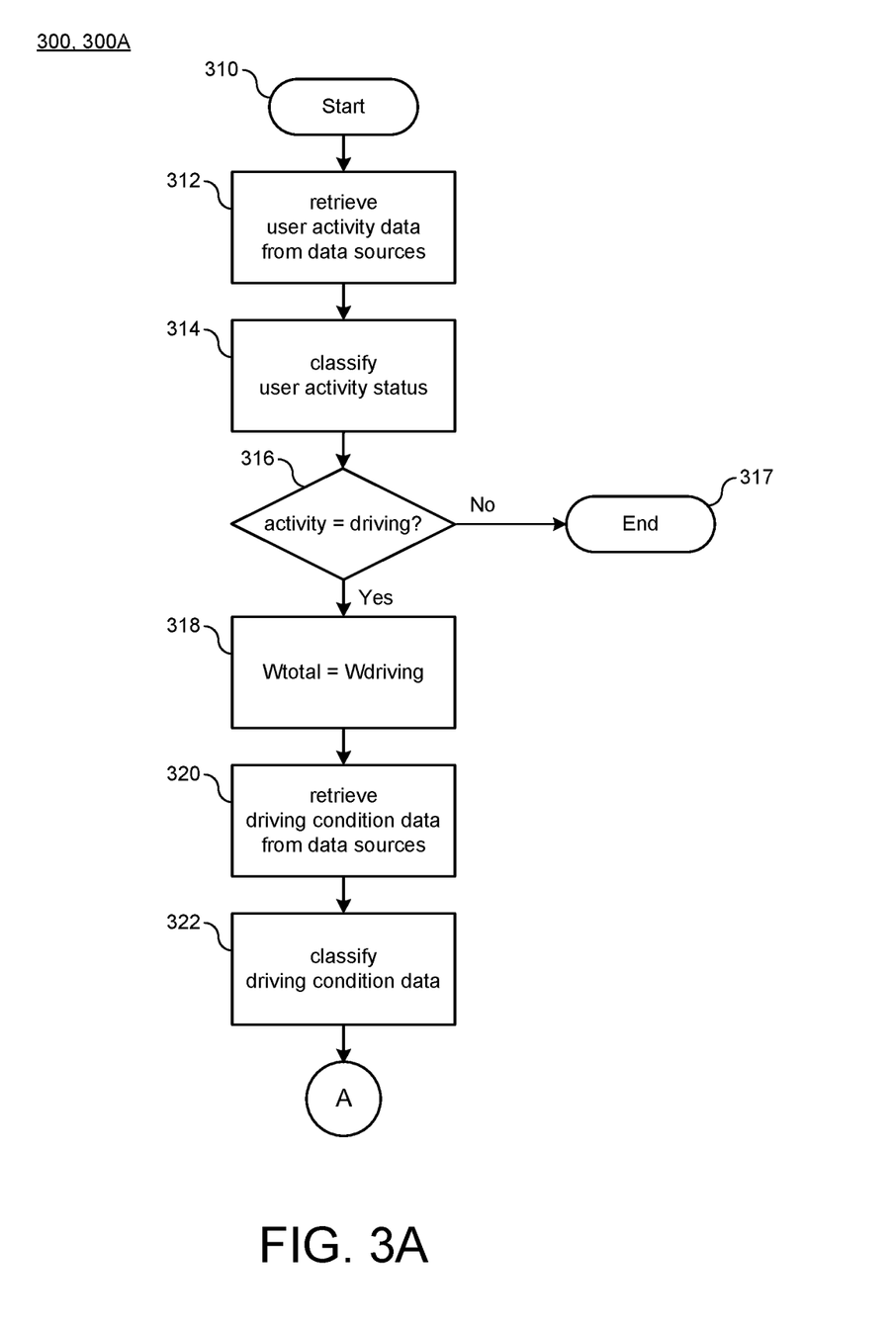
FIGS. 3A-3C are process flow diagrams illustrating one embodiment of a method for implementing cognitive workload awareness in driving context.
Figure 3B:
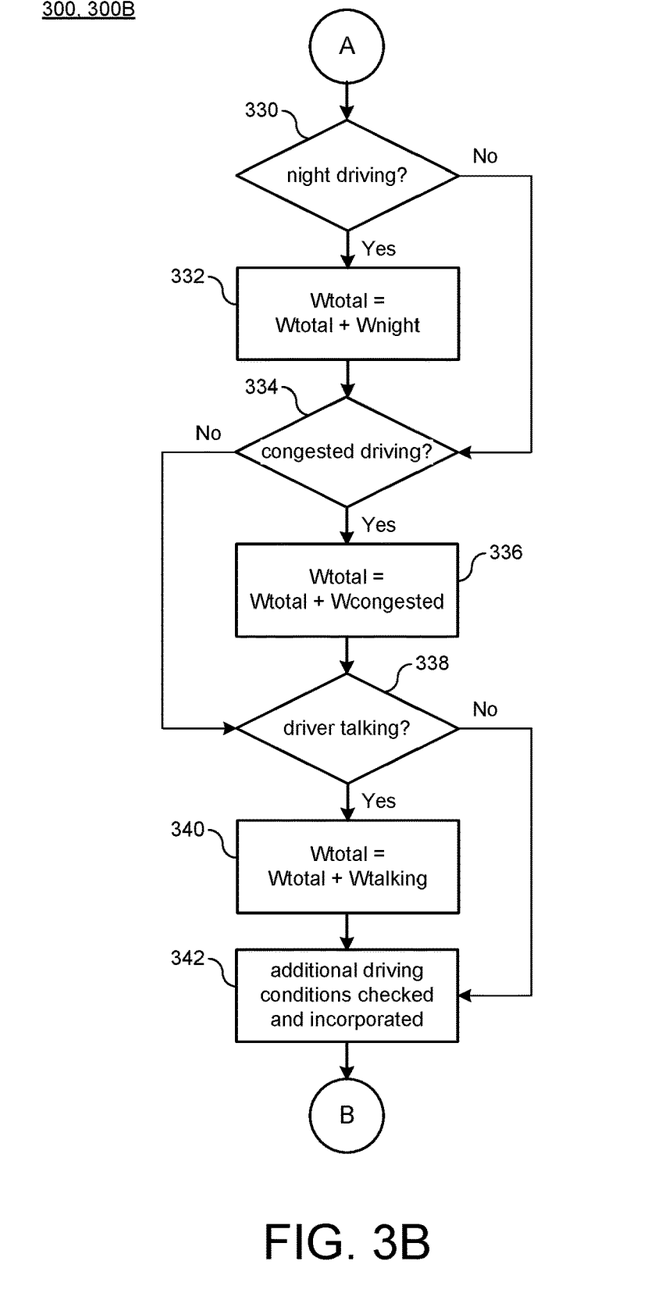
Figure 3C:
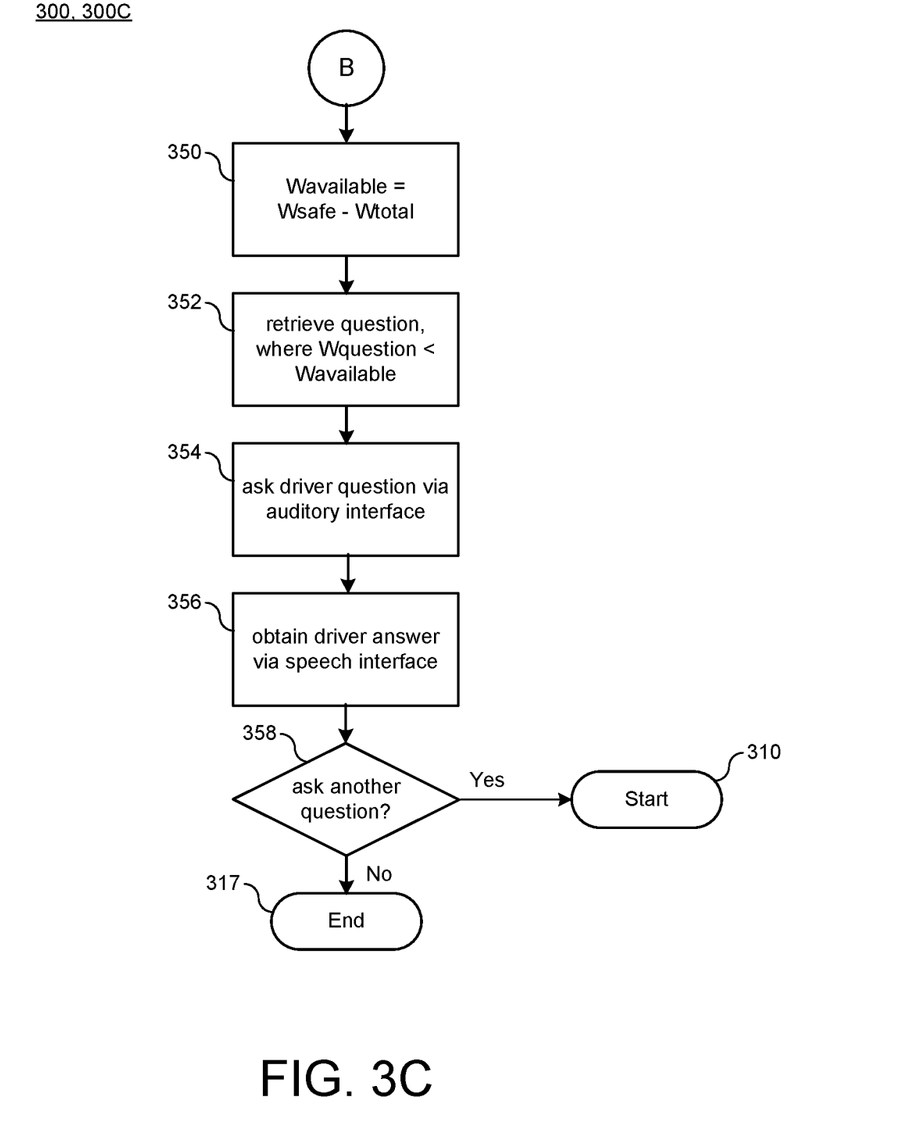

FIGS. 3A-3C are process flow diagrams illustrating one embodiment of a method 300 for implementing cognitive workload awareness in driving context.

In particular, FIG. 3A is a process flow diagram illustrating a first portion 300A of method 300 for implementing various schemes and techniques associated with cognitive workload awareness in driving context.

The method 300 and/or processes related thereto may begin with block 310, and in block 312, the method 300 retrieves user activity data from one or more data sources, such as, e.g., external sources and networks 180, 182, 184, 186 of FIG. 1. In some cases, the user activity data may be received from one or more user interface devices, such as, e.g., the user interfaces 120A, 120B, . . . , 120N of FIG. 1.

In block 314, the method 300 may classify various components of the user activity data of the driver with a user activity status of the driver, e.g., as described herein in reference to FIGS. 2A-2B.

In decision block 316, the method 300 may decide whether the user activity data of the driver is associated with driving activity of the driver. If no, then the method 300 may terminate in block 317. Otherwise, if yes, then in block 318, the method 300 may associate the cognitive workload of the driver with a total workload Wtotal of the driver that references a driving workload Wdriving of the driver related to driving activities of the driver while the driver is operating a vehicle.

$$Wtotal=Wdriving$$

In block 320, the method 320 may retrieve various driving condition data from at least one of the data sources 180, 182, 184, 186 and/or from at least one of the user interfaces 120A, 120B, . . . , 120N.

In block 322, the method 300 may further classify various components of the driving condition data that is associated with the driving activities of the driver.

FIG. 3B is a process flow diagram illustrating a second portion 300B of method 300 for implementing cognitive workload awareness in driving context.

In decision block 330, the method 300 may decide whether the driving activity data of the driver is associated with night driving activity of the driver. If no, then the method 300 may proceed to decision block 334. Otherwise, if yes, then in block 332, the method 300 may associate the total cognitive workload Wtotal of the driver by adding a night driving cognitive workload Wnight of the driver to the total cognitive workload Wtotal of the driver.

$$Wtotal=Wtotal+Wnight$$

In decision block 334, the method 300 may decide whether the driving activity data of the driver is associated with congested driving activity of the driver. If no, then the method 300 may proceed to decision block 338. Otherwise, if yes, then in block 336, the method 300 may associate the total cognitive workload Wtotal of the driver by adding a congested driving cognitive workload Wcongested of the driver to the total cognitive workload Wtotal of the driver.

$$Wtotal=Wtotal+Wcongested$$

In decision block 338, the method 300 may decide whether the driving activity data of the driver is associated with talking while driving activity of the driver. If no, then the method 300 may proceed to block 342. Otherwise, if yes, then in block 340, the method 300 may associate the total cognitive workload Wtotal of the driver by adding a talking while driving cognitive workload Wtalking of the driver to the total cognitive workload Wtotal of the driver.

$$Wtotal=Wtotal+Wtalking$$

In block 342, the method 300 may decide whether any additional driving activity and/or condition data of the driver should be associated with the driving activity of the driver. Therefore, in some optional instances, the method 300 may associate the total cognitive workload Wtotal of the driver by any additional driving cognitive workload Wadditional of the driver to the total cognitive workload Wtotal of the driver.

$$Wtotal=Wtotal+Wadditional$$

FIG. 3C is a process flow diagram illustrating a third portion 300C of method 300 for implementing cognitive workload awareness in driving context.

In block 350, the method 300 may determine or calculate a safe cognitive workload Wsafe of the driver and/or a safe cognitive workload boundary for the driver associated with the safe cognitive workload Wsafe of the driver. Further, in block 350, the method 300 may determine or calculate an available QnA cognitive workload Wavailable of the driver by subtracting the total cognitive workload Wtotal of the driver from the safe cognitive workload Wsafe of the driver.

$$Wavailable=Wsafe-Wtotal$$

In block 352, the method 300 may retrieve or fetch a QnA task or question from a QnA source, such as, e.g., the QnA service provider 180 of FIG. 1. The QnA task or question for driver response may have a question cognitive workload Wquestion that is at least less than the available QnA cognitive workload Wavailable of the driver.

$$Wquestion<Wavailable$$

In some cases, the fetched QnA task for driver response has a corresponding cognitive workload of less than a difference between the safe cognitive workload Wsafe and the total cognitive workload W total.

In block 354, if the question cognitive workload Wquestion is less than the available QnA cognitive workload Wavailable, then the method 300 may ask the driver a question associated with the QnA task via an auditory interface (e.g., auditory interface 120E of FIG. 1, which may include audible output from a speaker). In this instance, the method 300 may fetch a QnA task or question for driver response from a QnA source (e.g., the QnA service provider 180 of FIG. 1) that may ensure the safe cognitive workload boundary for safe driving 214, as described in reference to FIG. 2A.

In block 356, the method 300 may receive and/or obtain an answer from the driver for the asked question associated with the QnA task via a speech interface (e.g., speech interface 120D of FIG. 1, which may include audible input from a microphone, or similar). In this instance, the method 300 may receive and/or obtain the answer to the QnA task or question for driver response as provided from the QnA source (e.g., the QnA service provider 180 of FIG. 1) so as to ensure the safe cognitive workload boundary for safe driving 214, as described in reference to FIG. 2A. In some implementations, the question asked and the driver's answer may be stored in memory and/or transferred to the QnA source that provided the QnA task or question.

In decision block 358, the method 300 may decide whether to ask another question and/or retrieve another QnA task from the QnA source (e.g., the QnA service provider 180 of FIG. 1). If no, then the method 300 terminates in block 317. Otherwise, if yes, then the method 300 may return to the start block 310 in FIG. 3A.

Figure 4A:
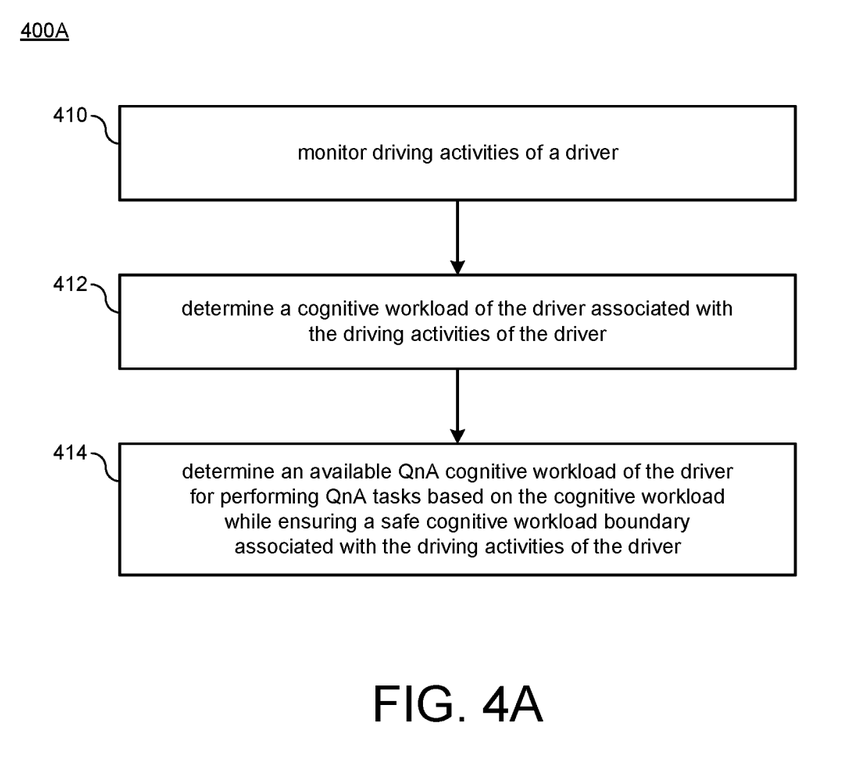
FIGS. 4A-4B are process flow diagrams illustrating various embodiments of other methods for implementing cognitive workload awareness in driving context.
Figure 4B:
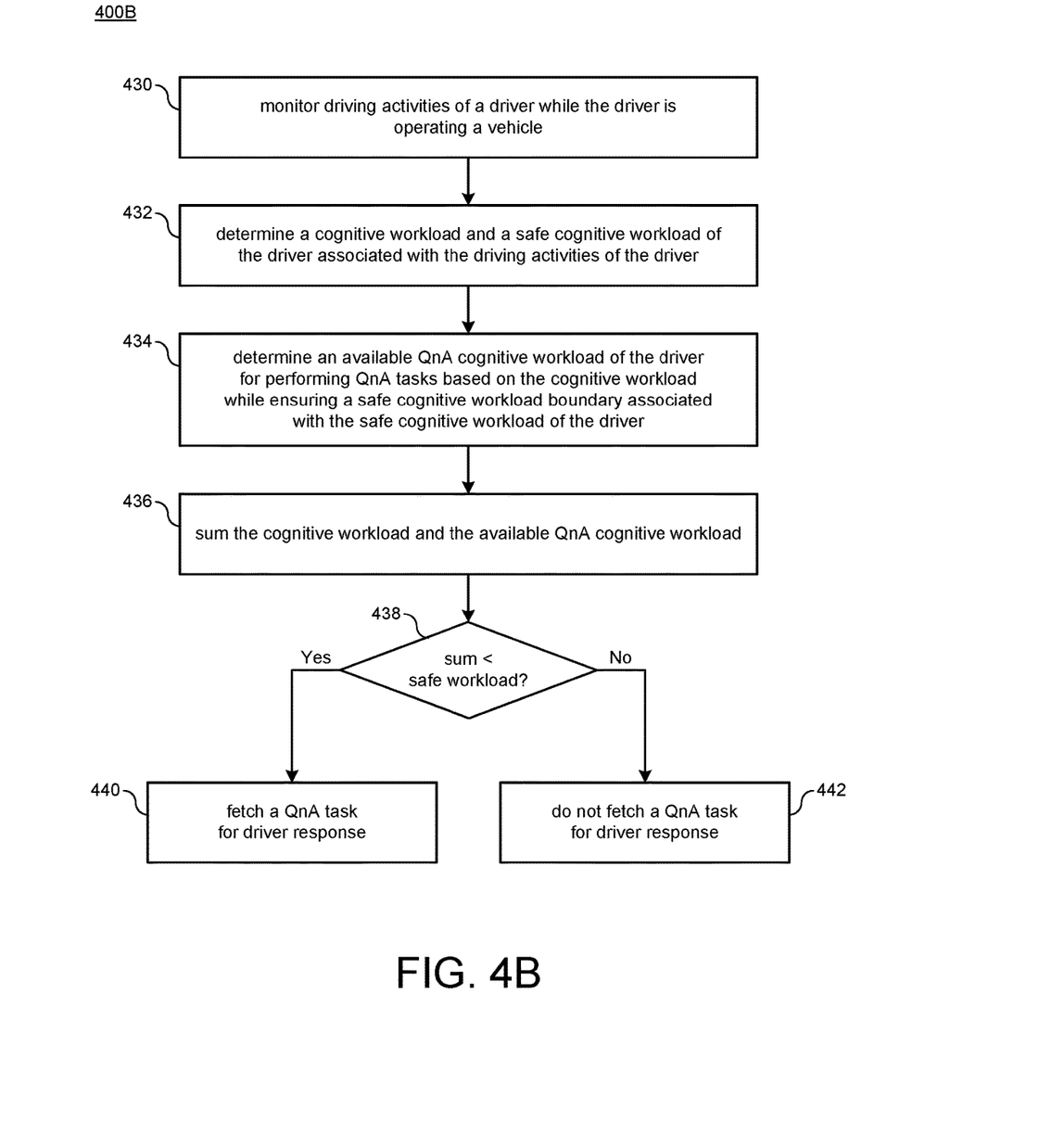

FIGS. 4A-4B are process flow diagrams illustrating various embodiments of some other methods 400A, 400B, respectively, for implementing various schemes and techniques associated with cognitive workload awareness in driving context.

In particular, FIG. 4A provides a process flow diagram illustrating one embodiment of a method 400A for implementing cognitive workload awareness in driving context. For instance, in block 410, the method 400A may monitor driving activities of a driver. In block 412, the method 400A may determine a cognitive workload of the driver associated with the driving activities of the driver. In block 414, the method 400A may determine an available QnA cognitive workload of the driver for performing QnA tasks based on the cognitive workload while ensuring a safe cognitive workload boundary associated with the driving activities of the driver.

Further, FIG. 4B provides another process flow diagram illustrating one embodiment of another method 400B for implementing cognitive workload awareness in driving context. For instance, in block 430, the method 400B may monitor various driving activities of a driver while the driver is operating a vehicle. In block 432, the method 400B may determine a cognitive workload and a safe cognitive workload of the driver associated with the driving activities of the driver. In block 434, the method 400B may determine an available QnA cognitive workload of the driver for performing QnA tasks based on the cognitive workload while ensuring a safe cognitive workload boundary associated with the safe cognitive workload of the driver. In some cases, in block 434, the method 400B may select a QnA task out of a pool of QnA tasks so that an additional cognitive workload that the selected QnA task will add to the cognitive workload does not exceed the available QnA cognitive workload. As described herein, the cognitive workload of the driver may also be referred to as a current cognitive workload of the driver.

In block 436, the method 400B may sum the cognitive workload and the safe cognitive workload of the driver. In decision block 438, the method 400B may decide whether the sum is less than the safe cognitive workload. If the summation of the cognitive workload and the additional cognitive workload that the fetched QnA task will add to the cognitive workload is at least less than the safe cognitive workload, then in block 440, the method 400B may fetch the QnA task for driver response so as to ensure the safe cognitive workload boundary. Otherwise, if the summation of the cognitive workload and the additional cognitive workload that the fetched QnA task will add to the cognitive workload is not less than the safe cognitive workload, then in block 442, the method 400B may not fetch a QnA task for driver response so as to ensure the safe cognitive workload boundary. In some instances, the method 400B may ensure that the fetched QnA task for driver response includes a corresponding cognitive workload of less than a difference between the safe cognitive workload and the cognitive workload.

It should be understood that even though methods 400A, 400B may indicate a particular order of operation execution, in some instances, various certain portions of the operations may be executed in a different order, and on different systems. In some other instances, additional operations, blocks, and/or steps may be added to and/or omitted from methods 400A, 400B. Further, the methods 400A, 400B may be implemented in hardware and/or software. If implemented in hardware, methods 400A, 400B may be implemented with various computing components, such as, e.g. described herein above in reference to FIG. 1. If implemented in software, the methods 400A, 400B may be implemented as a program or software instruction process that may be configured for implementing cognitive workload awareness in driving context as described herein. Further, if implemented in software, instructions related to implementing the methods 400A, 400B may be stored in memory and/or a database. For instance, a computer or various other computing devices having a processor and memory may be configured to perform methods 400A, 400B.

In various implementations, methods and system provided herein may refer to dynamically assigning micro question-and-answer (QnA) tasks to drivers with cognitive workload awareness. For instance, in some cases, a driver's current cognitive workload may be dynamically estimated based on data and information related to current driving activity, driving time, driving condition, activities with passengers, etc. This data and information may be retrieved from data sources including, e.g., the driver's or passengers' mobile devices, vehicular sensors, cloud-based information providers, etc. Micro question-and-answer (QnA) tasks may be selected and assigned considering the driver's available cognitive workload and pre-profiled cognitive workload of the tasks.

Figure 5:
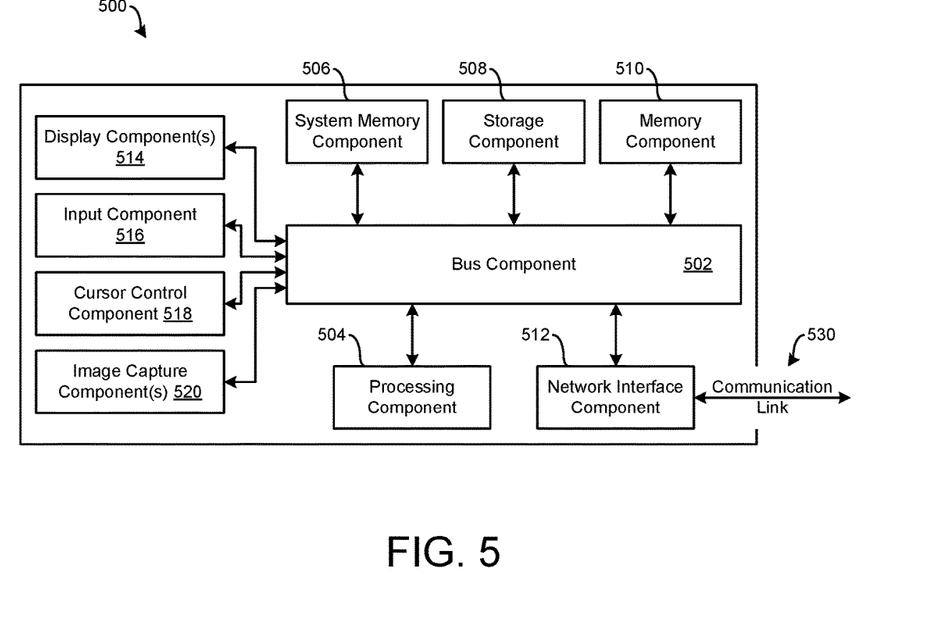
FIG. 5 is a block diagram illustrating one embodiment of a computing device for implementing cognitive workload awareness in driving context.

FIG. 5 shows a block diagram illustrating one embodiment of a computing device 500 suitable for implementing various methods and techniques associated with cognitive workload awareness in driving context, including components of an apparatus, such as, e.g., the computing device 102 and/or the UIs 120. In some implementations, the computing device 102 includes a communication network component 512 that is capable of communicating over one or more wired and/or wireless communication links 530 with the external network resources 180, 182, 184 and the external networks 186. Therefore, it should be appreciated that the computing device 102 may be implemented as the computing device 500 for network computing and communication in a manner as follows.

In accordance with embodiments of the disclosure, the computer system 500 includes a bus 502 and/or other communication mechanism for communicating data and information, which interconnects subsystems and components, including processing component 504 (e.g., processor, micro-controller, digital signal processor (DSP), etc.), system memory component 506 (e.g., RAM), static storage component 508 (e.g., ROM), memory component 510 (e.g., magnetic), network interface component 512 (e.g., modem or Ethernet card), one or more display components 514 (e.g., LCD), input component 516 (e.g., keyboard, push-buttons), cursor control component 518 (e.g., slider), and one or more image capture components 520 (e.g., one or more digital cameras). In one implementation, the memory component 510 may comprise one or more databases having one or more flash drive components, disk drive components, or similar.

In accordance with various embodiments of the disclosure, the computer system 500 may perform specific operations by the processor 504 executing one or more sequences of one or more instructions contained in system memory component 506. Such instructions may be read into the system memory component 506 from another computer readable medium, such as static storage component 508 or memory component 510. In other embodiments, hard-wired circuitry may be used in place of or in combination with software instructions to implement the disclosure.

Logic may be encoded in a computer readable medium, which may refer to any medium that participates in providing instructions to processor 504 for execution. Such a medium may take many forms, including but not limited to, non-volatile media and volatile media. In some implementations, non-volatile media includes optical or magnetic disks, such as memory component 510, and volatile media includes dynamic memory, such as system memory component 506. In some implementations, data and information related to execution instructions may be transmitted to computer system 500 via a transmission media, such as in the form of acoustic or light waves, including those generated during radio frequency (RF) waves, infrared (IR) data communications, and/or microwave (MW) communication. In various implementations, transmission media may include coaxial cables, copper wire, and/or fiber optics, including wires that comprise bus 502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In some embodiments of the disclosure, execution of instruction sequences to practice the disclosure may be performed by the computer system 500. In some other embodiments of the disclosure, a plurality of computer systems 500 may be coupled by communication link 530 (e.g., LAN, WLAN, PTSN, and/or various other wired or wireless networks, including telecommunications, mobile, and cellular phone networks) and may thus perform various instruction sequences to thereby practice various implementations of the disclosure in coordination with one another.

In various embodiments of the disclosure, the computer system 500 may transmit and receive messages, data, information, and instructions, including one or more programs (i.e., application code) through a communication link 530 and a communication interface 512. Further, received program code may be executed by the processor 504 as received and/or stored in the memory component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
an activity monitor module that electronically retrieves data from a vehicle diagnostic interface and at least one other electronic interface that is accessible from onboard a moving vehicle to monitor driving activities of a driver;
a workload analysis module that determines a cognitive workload of the driver associated with the driving activities of the driver the retrieved data;
a question-and-answer (QnA) dispatch module that determines an available QnA cognitive workload of the driver for performing QnA tasks communicated over a network to the driver based on the cognitive workload while ensuring a safe cognitive workload boundary associated with the driving activities of the driver;
wherein said modules comprise one or more of hardware circuits, a programmable hardware device, and a processor executing code stored in memory.

2. The apparatus of claim 1, wherein the at least one other electronic interface is selected from a group consisting of an external interface configured to communicate traffic-related data, an external interface configured to communication weather-related data, an external interface configured to communicate location-related data, an external interface configured to communicate information from external environmental sensors, an external interface configured to communicate information from one or more cloud service providers, a speech interface configured to communicate voice input data, an auditory interface configured to communicate audible output data, and a user device interface configured to communicate information related to user settings from one or more mobile devices.

3. The apparatus of claim 1, wherein the workload analysis module further determines a safe cognitive workload of the driver associated with the driving activities of the driver.

4. The apparatus of claim 3, wherein:
in response to a summation of the cognitive workload and an additional cognitive workload that the fetched QnA task adds to the cognitive workload being less than the safe cognitive workload, the QnA dispatch module fetches a QnA task for driver response, and
in response to the summation of the cognitive workload and the additional cognitive workload that the fetched QnA task adds to the cognitive workload being equal to or greater than the safe cognitive workload, the QnA dispatch module does not fetch a QnA task for driver response.

5. The apparatus of claim 4, wherein the fetched QnA task for driver response comprises a corresponding cognitive workload of less than a difference between the safe cognitive workload and the cognitive workload.

6. The apparatus of claim 1, wherein the driving activities of the driver include talking with one or more passengers while the driver is operating a vehicle.

7. The apparatus of claim 1, wherein the cognitive workload of the driver includes a baseline cognitive workload of the driver and one or more variable cognitive workloads of the driver associated with the driving activities of the driver.

8. The apparatus of claim 7, wherein the baseline cognitive workload is associated with default driving activities of the driver including driving a vehicle under routine mental, physical, and temporal operating conditions.

9. The apparatus of claim 7, wherein the one or more variable cognitive workloads include one or more intensive task workloads associated with metropolitan driving activities, congested driving activities, extreme weather driving activities, and night driving activities.

10. The apparatus of claim 7, wherein the one or more variable cognitive workloads include one or more of listening to music, controlling car audio, and conducting hands-free communication via a wireless network.

11. The apparatus of claim 1, wherein the workload analysis module determines an interface modality of the driver including hands-free communication between the apparatus and the driver.

12. The apparatus of claim 11, wherein the hands-free communication between the apparatus and the driver includes audible speech from the driver and voice recognition by the apparatus via one or more user interface components and a microphone.

13. The apparatus of claim 11, wherein the hands-free communication between the apparatus and the driver includes audible listening by the driver and computerized speech from the apparatus via one or more user interface components and a speaker.

14. The apparatus of claim 1, wherein the QnA tasks include dynamically fetched QnA tasks associated with one or more of surveys, polls, and context aware questions.

15. The apparatus of claim 1, wherein the QnA tasks include customer satisfaction surveys.

16. The apparatus of claim 1, wherein the QnA tasks include public polling interviews.

17. The apparatus of claim 1, wherein the QnA tasks include crowd-source questions including one or more of single-sentence interpretation, ground-truth tagging to auditory data, and unknown music classification associated with genre and/or mood.

18. The apparatus of claim 1, wherein the QnA tasks include context aware questions including one or more of traffic status questions, accident report questions, and point-of-view questions associated with location and/or time.

19. A method, comprising:
electronically retrieving data from a vehicle diagnostic interface and at least one other electronic interface that is accessible from onboard a moving vehicle to monitor driving activities of a driver while the driver is operating a vehicle;
determining a cognitive workload and a safe cognitive workload of the driver associated with the driving activities of the driver;
determining an available QnA cognitive workload of the driver for performing QnA tasks communicated over a network to the driver based on the cognitive workload while ensuring a safe cognitive workload boundary associated with the safe cognitive workload of the driver; and
fetching a QnA task over the network for driver response if a summation of the cognitive workload and an additional cognitive workload that the fetched QnA task adds to the cognitive workload is less than the safe cognitive workload so as to ensure the safe cognitive workload boundary,
wherein the fetched QnA task for driver response has a corresponding cognitive workload of less than a difference between the safe cognitive workload and the cognitive workload.

20. A non-transitory computer-readable medium having stored thereon a plurality of computer-executable instructions that, when executed by a computer, cause the computer to:
electronically retrieve data from a vehicle diagnostic interface and at least one other electronic interface that is accessible from onboard a moving vehicle to monitor driving activities of a driver while the driver is operating a vehicle;
determine a cognitive workload and a safe cognitive workload of the driver associated with the driving activities of the driver;
determine an available QnA cognitive workload of the driver for performing QnA tasks communicated over a network to the driver based on the cognitive workload while ensuring a safe cognitive workload boundary associated with the safe cognitive workload of the driver; and
fetch a QnA task for driver response if a summation of the cognitive workload and an additional cognitive workload that the fetched QnA task adds to the cognitive workload is less than the safe cognitive workload so as to ensure the safe cognitive workload boundary,
wherein the fetched QnA task for driver response has a corresponding cognitive workload of less than a difference between the safe cognitive workload and the cognitive workload.

* * * * *